Figure 1:
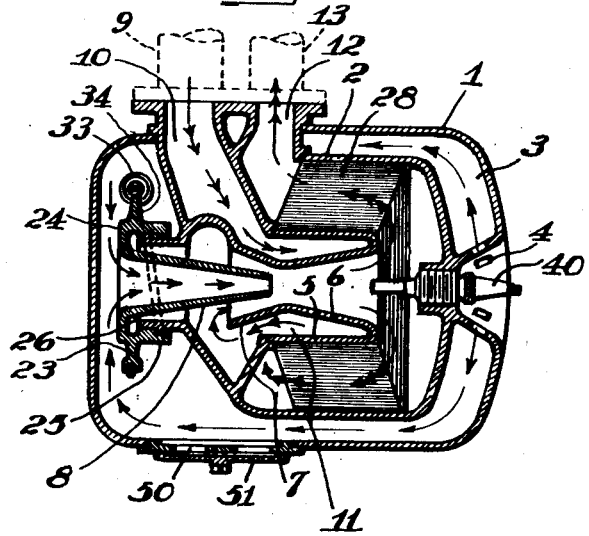

Jan. 20, 1931.  J. C. W. FRAZER  1,789,812
METHOD OF ELIMINATING COMBUSTIBLE CONSTITUENTS FROM THE PRODUCTS
OF COMBUSTION OF AN INTERNAL COMBUSTION ENGINE
Filed Aug. 12, 1929

WITNESS
A.B.Wallace.

INVENTOR
Joseph C. W. Frazer,
By Brown & Critchlow
Attorneys.

Patented Jan. 20, 1931

1,789,812

UNITED STATES PATENT OFFICE

JOSEPH C. W. FRAZER, OF BALTIMORE, MARYLAND

METHOD OF ELIMINATING COMBUSTIBLE CONSTITUENTS FROM THE PRODUCTS OF COMBUSTION OF AN INTERNAL-COMBUSTION ENGINE

Application filed August 12, 1929. Serial No. 385,453.

The invention pertains to the elimination of poisonous and noxious gases and vapors from the products of combustion of internal combustion engines, and has particularly to do with processes for this purpose in which such products are subjected to the action of catalysts.

Various attempts have been made to eliminate carbon monoxide from the products of combustion of internal combustion engines by the use of catalysts, and in such attempts various catalysts have been tried or suggested. However, while there are several known catalysts capable of oxidizing carbon monoxide, to the best of my knowledge none of them are suitable for removing carbon monoxide from these engine gases for any considerable length of time. The reason for this is that while some known catalysts are generally capable of oxidizing carbon monoxide, they lack stability under the high temperature conditions which necessarily prevail when used for treating these products of combustion. The matter would be simple if carbon monoxide were the only combustible constituent of these products of combustion. However, this is not the case. These products contain gasoline and lubricating oil, or vapors of them, or other combustible constituents resulting from incomplete combustion in the presence of gasoline and lubricating oil, which various constituents burn when subjected to the elevated temperatures that prevail during the catalytic oxidation of carbon monoxide to carbon dioxide, and the increase in temperature consequent upon the burning of these various constituents so increases the temperature of the catalysts which have been used or suggested for oxidizing carbon monoxide that these catalysts have their activity materially decreased, or entirely destroyed. They therefore lack stability, among other reasons, because of the high temperatures which necessarily prevail. Furthermore, some of the prior catalysts become poisoned by various constituents, including water, found in these products of combustion, which is another cause of their lack of stability. A still further cause of lack of stability may be, and probably is, the alternating high and low temperatures to which catalysts are necessarily subjected when used in automobiles for the purpose stated.

The object of this invention is to provide a method of eliminating, by the action of a catalyst, combustible constituents, including carbon monoxide, from the products of combustion of internal combustion engines, in which the catalyst retains its stability and activity indefinitely and continuously under the temperature and other conditions incident to such use.

The invention is predicated upon my discovery that its stated object is attained by subjecting the products of combustion of an internal combustion engine, in the presence of oxygen, to the action of a catalyst comprising what is herein broadly designated as a chromite. Such a catalyst comprises a combination of an oxide of chromium with a metallic oxide which is sufficiently basic, in a proportion corresponding to a chromite. The cation of the chromite may be any metal whose oxide or hydroxide is sufficiently basic, and preferably comprises a metal of the sixth, seventh and eighth groups of the periodic system. In the event that the chromite cation is capable of existing in several stages of oxidation, it is preferably present in its highest stage, the most suitable catalyst being, as far as I am now aware, an artificially prepared product.

While I have found that a zinc chromite gives good results, I have discovered that the best results are obtained by an iron chromite, formed by the reduction of an iron chromate solution applied as a coating to a suitable carrier. For reasons which will presently appear, the carrier is preferably a heat-conducting metal capable of resisting corrosion under the temperature and other conditions which prevail. While I have discovered that Monel metal, a copper nickel alloy, is particularly suitable, other heat-conducting and corrosion resisting metals, such as high chromium irons and steels, may be used.

As a specific example of the preferred catalyst, namely, an iron chromite, and the manner in which it is made, there is first formed a solution of an iron chromate by solution of iron hydroxide in chromic acid solution. By way of example and not of limitation, 404 grams of hydrated ferric nitrate dissolved in about three liters of water is precipitated with half-strength ammonia, and to the resultant suspension of ferric hydroxide there is added sufficient chromic oxide in concentrated aqueous solution to form a ferric chromate. Because in the case of an iron chromite catalyst it is preferred to form the acid chromate, a solution of 300 grams of chromic oxide in sufficient water to dissolve it is added to the iron hydroxide suspension. When the chromic acid is added, the ferric hydroxide is flocculated, and upon vigorous stirring it rapidly dissolves, forming a deep red solution. Metal carriers of the type described, after being thoroughly freed from grease and other foreign matter, as by heating to a bright red heat, are dipped into the iron chromate solution, and after the excess solution is drained off, they are dried and heated to a temperature of about 110° C. Upon such heating, which may be effected before the catalyst is used, or by the initial use of the catalyst, the chromate breaks down and forms a chromite which may be represented by the empirical formula $Fe_2O_3.3Cr_2O_3$.

The catalyst used in the practice of this invention may also be formed by first making, in the case of an iron chromite, a chromium alloy containing about 74% chromium, the remainder being iron except for impurities, and oxidizing the surface of the alloy.

In the practice of this invention the products of combustion of an internal combustion engine are first mixed with sufficient oxygen to oxidize their combustible constituents, and the mixture is then subjected to the catalyst by bringing it into contact with its surface. As the products of combustion flow from an engine, oxygen is added to them by mixing air with them in proportion to their volume, which varies with the speed of the engine. Accordingly, air may be supplied to the products of combustion by a blower operatively connected to the engine in such a way that air is supplied in proportion to the speed of the engine, or this may be done by an air-entraining nozzle, the relative position of the elements of which may be controlled in proportion to the speed of an engine, or which may be otherwise so constructed as to vary the amount of air mixed with the products of combustion. Because the back pressure on an engine, or in other words, the static pressure of its products of combustion, varies with relation to the volume of such products, the pressure of the products may be utilized to automatically vary the amount of air mixed with them. In this, and in other suitable ways, air may be so added to the products of combustion in proportion to their volume, and to their composition, that sufficient oxygen is always present to effect complete, or substantially complete, combustion of the combustible constituents of the products regardless of their composition.

In the case of the preferred form of the iron chromite catalyst described above, I have found that it is necessary that the catalyst be raised to a temperature of about 450° C. to enable it to function satisfactorily for the elimination of the combustible constituents from the products of combustion. When unheated air is mixed with these products, it cools them below this temperature, thus making it necessary to raise the temperature of the catalyst in case the catalyst is below this temperature when the products of combustion initially pass through it. When the catalyst has been previously heated by its activity due to the running of an engine, and has not cooled down, it is of course unnecessary to preheat the catalyst to cause it to function satisfactorily. The preheating of the catalyst may be done directly, as by electric resistance or arc heating, or indirectly by heating the incoming air or products of combustion, or the mixture of the two.

Due to the complete, or substantially complete, combustion of the combustible constituents effected by the practice of this invention, so much heat is generated in the catalytic zone that it is very desirable to make provision for its removal therefrom, both to prevent the catalyst from being heated to such a high temperature that it loses its activity or stability, and also to avoid excessive heating and possibly melting of the catalyst carrier and its container. It is for this reason that the catalyst carrier is preferably a heat-conducting metal. By placing the catalyst upon a heat-conducting carrier in thermal contact with the wall of the catalyst container, heat is conducted from the catalytic zone through the wall of the container where it may be, and preferably is, transferred to the incoming air, or products of combustion, or a mixture of the two. In this way, heat is advantageously conducted from the catalytic zone, and advantageously supplied to gases which pass through this zone.

Figure 2:
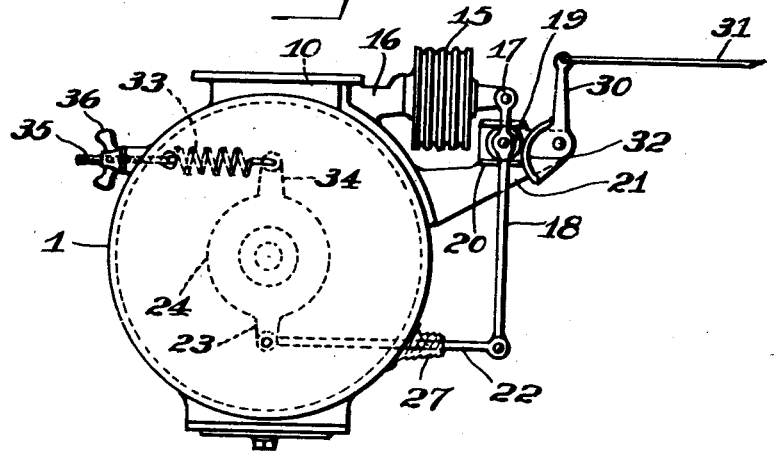
Figure 3:
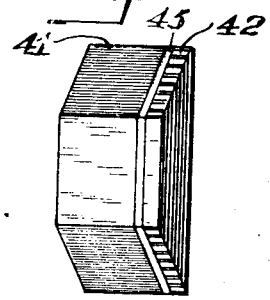
Figure 4:
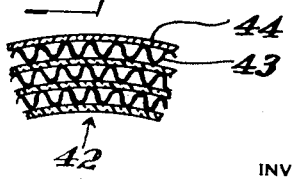

The invention may be further explained with reference to the accompanying drawings, which somewhat diagrammatically illustrate an apparatus with which it may be practiced, although it will be understood that the invention may be practiced by numerous other forms of apparatus. In the drawings, Fig. 1 is a central sectional view through such apparatus; Fig. 2 an elevation of the left end of the apparatus as seen in Fig. 1; Fig. 3 a sectional view of a catalyst constructed to be itself preheated by electric resistance elements; and Fig. 4 a detail view to enlarged scale of a portion of the end of the catalyst shown in Fig. 3.

The apparatus comprises an outer casing 1 and an inner casing 2 which form between them a compartment 3 through which air flows for mixing with the products of combustion, the air entering this compartment through ports 4 in a depressed portion of casing 1. Arranged centrally of the apparatus is a sleeve 5, one end of which is connected to a tube 6 whose walls diverge from a throat 7, the left end of which tube, as seen in Fig. 1, forms one element of an air-entraining nozzle whose other element is a conical tube or nozzle 8. The apparatus is connected to the exhaust of an internal combustion engine by a conduit 9, through which the products of combustion from the engine flow into a passage 10 leading to an annular chamber 11 formed between sleeve 5 and tube 6. From this chamber they flow into the left flaring end of tube 6, and entrain air which flows from compartment 3 through nozzle 8, the air becoming mixed with the products of combustion. This mixture then flows through a catalyst 28 which is placed between tube 5 and inner casing 2, from which it passes through a discharge passage 12 connected to a conduit 13 leading to the atmosphere, or to an instrumentality for utilizing its heat content.

When the catalyst is of the preferred form explained above, namely, a layer of iron chromite on a sheet of heat-conducting and corrosion-resisting metal, it may be arranged in the apparatus as shown in Fig. 1. In other words, the sheets of catalyst may be arranged in concentric layers between tube 5 and casing 2. These sheets may be screens, or slightly corrugated or perforated plates. They are arranged in compact relationship, the strands of screens, or the corrugations or perforations of plates sufficiently spacing the sheets from each other to permit flow of the mixture of air and products of combustion between them and in contact with their surfaces. Because the surface area of the coating of catalyst is materially increased by the use of screens, they are preferably used as the catalyst carrier. I have found fairly closely woven screens, twelve or fourteen mesh, of Monel metal wire about one-thirty-second of an inch in diameter to be particularly suitable as a catalyst carrier.

In this apparatus provision is made for utilizing the pressure of the products of combustion for varying the amount of air mixed with them. To this end, such pressure is utilized to move nozzle 8 longitudinally with relation to throat 7 of tube 6 to increase or decrease the area of the passage between the end of this nozzle and the adjacent outward flaring wall of tube 6 in proportion, respectively, with the increase and decrease of the pressure of the products.

As shown in Fig. 2 a resilient metal sylphon tube 15 is connected by a conduit 16 with inlet passage 10 so that the products of combustion exert their pressure upon the interior of the tube to determine its amount of expansion. To the outer end of tube 15 there is pivotally connected at 17 one end of a lever 18 having a floating fulcrum formed by a roller 19 attached to the lever and mounted in a guide 20 supported by a bracket 21 attached to the casing of the apparatus. The other end of this lever is pivotally connected to one end of a rod 22, the other end of which is pivotally connected to an arm 23 projecting laterally from an outwardly extending flange 24 formed on the left end of nozzle 8. Flange 24 is provided with a ring 25 having a steep interior thread which engages a corresponding exterior thread formed on a sleeve 26 at the left end of interior casing 2, the arrangement being such that rotation of the nozzle through a relatively small arc causes the right end of the nozzle to move longitudinally with relation to throat 7 of tube 6 to sufficiently vary the size of the air passage between the end of the nozzle and the adjacent flaring wall of tube 6. To compensate for the angular and longitudinal movements of the nozzle, rod 22 may extend through an enlarged opening in casing 1, a flexible boot 27 being provided between the rod and casing to keep the opening closed.

Provision is also made for simultaneously controlling, by any suitable automatic or manually operated means, the volume of air mixed with the products of combustion in proportion with the volume of combustible mixture fed to an engine. To this end, in the illustrative embodiment of the invention, a lever 30, suitably connected as by a rod 31 to the accelerator control of an automobile, is pivotally supported by bracket 21 and is provided with a cam 32 which bears against roller 19 of lever 18. The arrangement is such that when the accelerator of an automobile is moved to increase the supply of the combustible mixture fed to an engine, rod 31 is moved to the right as viewed in Fig. 2, with the result that cam 32 presses roller 19 to the left to rotate nozzle 8 for increasing the air supply passage. Roller 19 of lever 18 may be held yieldingly in contact with cam 32, and the end of nozzle 8 urged towards throat 7 of tube 6, by a spring 33 connected at one end to an arm 34 attached to flange 24, and at its other end to a rod 35, the position of which rod may be adjusted by a thumb screw 36 for varying the tension of the spring.

When the temperature of catalyst 28 is below that at which it functions satisfactorily to oxidize the combustible constituents of the products of combustion, as it is when an automobile has been standing idle for some time the temperature of the catalyst may be raised indirectly by preheating gases which flow through it. For this purpose the apparatus is provided with a spark plug 40 having its spark gap arranged in or adjacent to tube 6 so that the mixture of air and products of combustion flow in contact with, and become heated by the spark. This plug may be electrically connected to the ignition system of an automobile by a circuit which may be manually controlled.

The catalyst may also be heated directly to raise it to a temperature at which it functions satisfactorily. For this purpose, the catalyst may, as shown in Fig. 3, comprise a main body 41, formed the same as catalyst 28 and an auxiliary end portion 42, the latter being formed of electric resistance ribbons 43 arranged between concentric bands of insulation 44, the ribbons being suitably electrically connected to the battery circuit of an automobile, the circuit being manually controlled. To insulate electric resistance ribbons 43 from the main body of the catalyst, and also from the casing of the apparatus, a suitable perforated body of insulation 45 is placed between ribbons 43 and catalyst 41. By coating ribbons 43 and insulation bands 44 with the catalytic material explained above a portion of the catalyst may be directly preheated by causing the electric current to flow through ribbons 43, and the main body of the catalyst indirectly preheated by end portion 42, and by the gases heated in their passage through the end portion.

In the operation of the apparatus, the preheating of the catalyst may be effected directly or indirectly, or both, in the manner just explained. Assuming that the catalyst has been heated to the temperature at which it fuctions satisfactorily, the flow of products of combustion through passage 10 and around tube 6 into its lower end is indicated by the double pointed arrow shown on Fig. 1. The products are preheated, and heat advantageously removed from the catalyst, by contact of the products with the interior wall of sleeve 5. The flow of the products through tube 6 draws air into chamber 3 between casing walls 1 and 2, the air flowing into the left end of nozzle 8, as indicated by the single pointed arrows on Fig. 1. In such flow the air becomes preheated by its contact with the outer wall of inner casing 2, which further serves to advantageously remove heat from the catalyst which is highly heated as a result of its activity. In case it is desired to reduce the temperature of the mixture, cool air may be let into the left end of the casing through ports 50, the opening of which may be regulated by a shutter 51. The mixture of air and products of combustion flow, as indicated by the triple pointed arrows, into the right end of the catalyst, and through it into discharge passage 12 and conduit 13, the combustible constituents of the products being eliminated by the action of the catalyst in their passage through it.

To test the practicability of the invention herein disclosed, and particularly to determine the stability and continued effectiveness of the catalyst used in the practice of the invention, I constructed a suitable apparatus and applied it to a six-cylinder automobile which had thus far traveled over 1500 miles. Like the apparatus herein disclosed, that so used included a container in which there were compactly arranged woven screens of Monel metal coated with an iron chromite made according to the solution procedure explained above. The apparatus included a spark plug for indirectly preheating the catalyst which was placed in heat-conducting contact with the wall of the container; provision was made for heating the incoming air by heat removed from the catalytic zone; and means were provided for varying the amount of air mixed with the products of combustion. Thermo couples were placed in various points of the apparatus to make tempearture readings, and samples of the effluent gases were taken and analyzed to determine their content of carbon monoxide.

By the apparatus thus used I found that during the entire run the carbon monoxide was continuously eliminated and the effluent gases were odorless. During the run, which was over both level and mountainous country roads, and through cities, the temperature in the catalytic zone was in several occasions as high as 1130° C. Nevertheless, at the end of the run it was found that the stability of the catalyst and its ability to continuosuly function and to start after intervals of idleness, had not been impaired.

According to the provisions of the patent statutes, I have explained the principle of my invention, and its mode of operation, and have given specific examples of how it may be practiced. Also, I have illustrated and described apparatus by the use of which the invention may be practiced. Hovever, I desire to have it understood that, within the scope of the appended claims, the invention may be practiced otherwise than as specifically described, and by the use of many forms of apparatus.

I claim as my invention:

1. The method of eliminating combustible constituents from the products of combustion of an internal combustion engine during intermittent operation thereof, comprising subjecting such products in a continuous substantially uncooled stream, and in the presence of oxygen, to the action of a catalyst comprising an artificially prepared metallic chromite.

2. The method of eliminating combustible constituents from the products of combustion of an internal combustion engine during intermittent operation thereof, comprising mixing a continuous substantially uncooled stream of such products with oxygen, and subjecting the mixture continuously to the action of a catalyst comprising an artificially prepared metallic chromite.

3. The method of eliminating combustible constituents from the products of combustion of an internal combustion engine during intermittent operation thereof, comprising mixing a continuous substantially uncooled stream of such products with oxygen, and subjecting the mixture continuously to the action of a catalyst comprising an artificially prepared chromite of a metal of the sixth, seventh or eighth groups of the periodic system.

4. The method of eliminating combustible constituents from the products of combustion of an internal combustion engine during intermittent operation thereof, comprising mixing a continuous substantially uncooled stream of such products with oxygen, and subjecting the mixture continuously to the action of a catalyst comprising an artificially prepared iron chromite.

5. The method of eliminating combustible constituents from the products of combustion of an internal combustion engine during intermittent operation thereof, comprising mixing a continuous substantially uncooled stream of such products with oxygen, and subjecting the mixture continuously to the action of a catalyst comprising an iron chromite corresponding substantially to the empirical formula $Fe_2O_3.3Cr_2O_3$.

6. The method of eliminating combustible constituents from the products of combustion of an internal combustion engine during intermittent operation thereof, comprising mixing a continuous substantially uncooled stream of such products with oxygen, and bringing a mixture continuously in contact with a catalyst comprising an artificially prepared iron chromite applied to grids of heat-conducting metal.

7. The method of eliminating combustible constituents from the products of combustion of an internal combustion engine during intermittent operation thereof, comprising mixing a continuous substantially uncooled stream of such products with oxygen in proportion to the volume thereof, and subjecting the mixture continuously to the action of a catalyst comprising an artificially prepared iron chromite.

8. The method of eliminating combustible constituents from the products of combustion of an internal combustion engine during intermittent operation thereof, comprising mixing a continuous substantially uncooled stream of such products with oxygen in proportion to the volume thereof, and bringing the mixture continuously in contact with a catalyst comprising an artificially prepared metallic chromite applied to grids of heat-conducting metal.

9. The method of eliminating combustible constituents from the products of combustion of an internal combustion engine during intermittent operation thereof, comprising mixing a continuous substantially uncooled stream of such products with oxygen, and subjecting the mixture continuously to the action of a catalyst comprising an artificially prepared metallic chromite, the temperature of the catalyst being not less than about 450° C.

10. The method of eliminating combustible constituents from the products of combustion of an internal combustion engine during intermittent operation thereof, comprising mixing a continuous substantially uncooled stream of such products with oxygen, and subjecting the mixture continuously to the action of a catalyst comprising an artificially prepared iron chromite, the temperature of the catalyst being not less than about 450° C.

In testimony whereof, I sign my name.

JOSEPH C. W. FRAZER.